Nov. 28, 1961 W. M. BUSKES 3,010,390
PLANOGRAPHIC PRINTING PLATES
Filed June 29, 1954 2 Sheets-Sheet 1

INVENTOR
WILLEM MARIE BUSKES
BY
Pollard, Johnston, Smythe & Robertson
ATTORNEYS

Nov. 28, 1961 W. M. BUSKES 3,010,390

PLANOGRAPHIC PRINTING PLATES

Filed June 29, 1954 2 Sheets-Sheet 2

INVENTOR
WILLEM MARIE BUSKES

BY

Pollard, Johnston, Smythe & Robertson

ATTORNEYS

United States Patent Office 3,010,390
Patented Nov. 28, 1961

3,010,390
PLANOGRAPHIC PRINTING PLATES
Willem Marie Buskes, Venlo, Netherlands
Filed June 29, 1954, Ser. No. 440,177
7 Claims. (Cl. 101—149.2)

The invention relates to a process for producing planographic prints from an existing original wherein the planographic printing plate is prepared by exposing a light-sensitive sheet to record an image of the original, pressing the exposed surface of the sheet against a receiving printing plate, to transfer matter imagewise from the exposed sheet to the surface of the receiving printing plate and separating the two surfaces.

The present invention relates more particularly to new planographic printing plates of the character obtained by use of the aforesaid photographic transfer process. This application is a continuation-in-part of my co-pending United States application Serial No. 341,198, filed March 9, 1953.

According to the present invention planographic printing plates are produced by the steps of image-wise exposing a light-sensitive sheet comprising a support having a hydrophilic surface and carrying on said surface in superposition, in order, porous hydrophobic matter and light-sensitive matter containing a hydrophilic binder, the said light-sensitive matter being such that exposure effects an alteration in the transferability after wetting with water of hydrophobic matter from the said sheet to another support; pressing the imagewise exposed surface of said sheet into contact with the surface of a receiving printing plate, with previous wetting with water of at least one of the contacting surfaces; separating the said surfaces whereby hydrophobic matter is transferred imagewise from said sheet to said printing plate; subjecting the printing plate to a finishing operation to render it suitable for planographic printing; and making planographic prints therefrom. In any transferable image area the porous hydrophobic matter may be wholly or only partially transferred.

In the process, sharp image portions are formed on the printing plate, carrying porous hydrophobic matter particularly on their upper surface, which image portions are highly receptive of greasy printing ink. Even after prolonged use in planographic printing the printing plate shows only little tendency to broadening of the image lines. After having taken up greasy ink, the image portions may serve as a good resist for etching.

Sensitizing of printing plates is unnecessary in the process of this invention. Accordingly, in the finishing operation, no matter (e.g. unexposed matter) need be removed from the printing plate. This is generally a somewhat tedious operation for those not particularly skilled in photomechanical work, and usually can only be avoided when the planographic printing is carried out in the dark. It is an advantage of the process of this invention that it considerably simplifies the procedure of obtaining the printing plate, and the invention thus brings photomechanical processing more within the reach of the unskilled. The invention is of particular value for the offset process which in offices and the like is carried out by relatively unskilled personnel.

Another especial advantage of the invention lies in the fact that the image which is present on the printing plate after transfer (even before finishing) is remarkably easy to retouch. Accordingly, retouching is preferably carried out between transfer and finishing. The possibility of such a simple retouching procedure does not generally exist in processes using sensitized printing plates.

Porous hydrophobic matter may be composed in many ways. Thus, for example, a substantially insoluble powder may be made to cohere by means of a suitable (limited) quantity of binder so as to form (e.g. on drying) a porous hydrophobic crust. The powder need not be hydrophobic per se; with powders such as barite, titanium dioxide and starch, a hydrophobic binder may be chosen. With other powders, such as soot, calcium stearate powder, aluminium powder and graphite, the binder may be hydrophobic or hydrophilic. Alternatively, porous hydrophobic matter may be formed from a hydrophobic film-forming material, mixed with a suitable quantity of a soluble substance, which for example can be washed out, leaving a porous hydrophobic film (for example a mixture of collodion with glycerol, compare United States Patent No. 2,590,857). The terms "permeable" and "porous" are equivalents (compare United States Patent No. 2,590,857). Although numerous methods of compounding porous hydrophobic matter are available, the examples will, for the sake of simplicity, only illustrate a few of them. It is to be noted that the porous hydrophobic matter should not form a layer of too great cohesion or a tough layer, e.g. of rubber.

The above-mentioned finishing of the printing plate may consist in making the blank portions of the plate more water-receptive before inking. With zinc and aluminium plates this may be achieved, for example, by treating them with a "fixing" solution, such as a solution of phosphoric acid and gum arabic.

Examples of other finishing methods are the following: The portions of a metal printing plate not covered with transferred matter may be etched chemically or electrolytically in order to make them more water-receptive; for the same purpose a layer of another metal may be formed on the open portions. However, if for example, copper is deposited on the open portions of a planographic steel plate, and the transferred matter is subsequently eliminated, a printing plate is obtained in which the portions corresponding to the transferred portions are water-receptive, whilst the portions corresponding to the non-transferred portions are greasy printing ink-receptive. By this finishing operation the selective receptivity of the printing plate is as it were reversed.

When the printing plate is a bi-metal plate with a greasy printing ink-receptive upper layer, finishing is achieved after the transfer by treating the surface of the plate with a chemical which takes the thin upper metal layer from the bi-metal plate. The transferred matter then functions as a resist. It may be allowed to remain on the printing plate, or may be removed because the upper metal layer of the bi-metal plate is greasy printing ink-receptive per se. In another finishing operation, which is analogous to a well-known reversal process, the transfer image on a water-receptive printing plate may, after having dried, be rubbed over or coated with an asphalt solution and then dried. Thereupon the transferred matter is eliminated from the surface, so that the original receiving surface (which is water-receptive) will eventually reappear in the portions which, immediately after the transfer, were covered with transferred matter.

In the following description, for the sake of simplicity, as a rule only the generic term "transfer" will be used. This term is thus used for direct, indirect, selective, bodily, first, second and further transfer, and for transfer of a remnant image. Wherever not otherwise indicated, the term "transfer" implies transfer at room temperature.

Examples of plates denoted by the term "receiving printing plate" are: a bi-metal plate (e.g. a steel plate having on its surface a thin layer of copper), a lithographic stone, a grained aluminium, zinc or steel plate, paper specially made for planography, an aluminium plate carrying a water-receptive oxide layer and a plastic sheet having a water-receptive surface, such as a superficially deacylated cellulose ester sheet.

In the process according to the invention wetting is effected with water. However, aqueous solutions (for example of salts, wetting agents or alcohol), which behave like water, may likewise be used.

In order to make the process more reliable and more accurately adjustable to the light-sensitive materials and receiving printing plates, which may be of various kinds, it is advisable to combine the operations of wetting and pressing-together in a single step. An apparatus for this is described later herein.

The invention will now be described with reference to the accompanying drawings which illustrate specific embodiments of the materials and apparatus used in the invention. In these drawings.

In the figures, corresponding parts are always designated by the same reference numbers.

Figure 1:
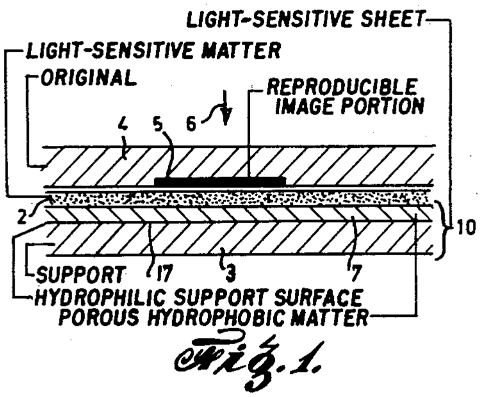
FIG. 1 illustrates the structure of a light-sensitive sheet for use in the process according to the invention, in contact with an original.

In FIG. 1 (diagrammatic cross-section) 3 represents a sheet-shaped support with a hydrophilic surface 17, consisting e.g. of completely or partially deacylated cellulose ester, 7 a layer of porous hydrophobic matter, and 2 a layer of light-sensitive matter with the binder; 2, 7, and 3 together form the light-sensitive sheet 10. A tracing 4 with a dense line 5 is in close contact with the light-sensitive sheet 10. However, for clearness' sake this close contact, as in some figures, is not shown. Similarly, for clearness' sake, the layers 7 and 2 are represented as clear-cut separate layers, but the invention is not limited thereto and there may, and often will be, no sharp demarcation between the two layers which may be partly intermingled. The same consideration applies to the layers 7 and 2 in the other figures. Exposure is effected in the direction of the arrow 6.

Figure 2:
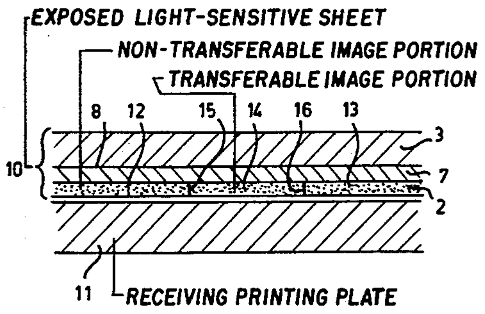
FIGS. 2 and 3 illustrate the procedure on transfer.

FIG. 2 represents the light-sensitive sheet 10, as exposed according to FIG. 1, turned upside down relative to FIG. 1, i.e. with the imagewise exposed layer 2 downward. The portions 12 and 13 of this layer are the non-transferable portions; portion 14 between the boundaries 15 and 16 represents the transferable portion. A receiving printing plate 11 is shown with its receiving surface upward. The sheets 10 and 11 are assumed to be pressed together. Previous to this pressing-together, the wetting operation has been carried out; thus a thin film of water may be assumed to be present between layer 2 and the upper surface of 11. After the pressing-together the sheets 10 and 11 are separated.

Figure 3:
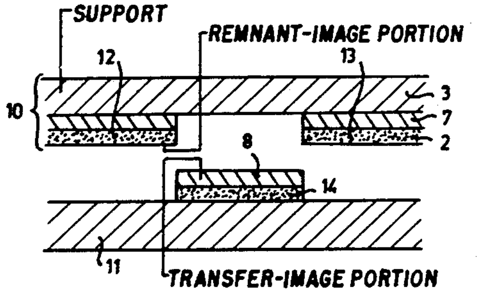

The situation then existing is illustrated by FIG. 3. The non-transferable portions 12 and 13 of layer 2 and the portions of layer 7, underlying these portions 12 and 13 have remained on support 3. The transferable portion 14, however, has become attached to receiving printing plate 11 (during the pressing-together) and thus a corresponding portion of layer 7, now numbered 8, has been transferred from light-sensitive sheet 10 to receiving printing plate 11.

When the transferable porous hydrophobic matter has insufficient cohesion, the transfer may be incomplete; i.e. on transfer this matter will only partially pass on to the receiving printing plate. Provided a sufficient quantity has been transferred, the printing plate may nevertheless be excellent.

In the light-sensitive sheets the light-sensitive and the porous hydrophobic matter cooperate in such a manner that the alteration in the light-sensitive matter caused by the exposure produces a difference in transferability of porous hydrophobic matter. As will be apparent, however, its complete transferability and the useful effect of said alteration are also to a considerable extent a matter of its adhesion to the support, either direct or by means of an intermediate substance. If this adhesion is too slight, it may occur, that, on transfer after image-wise exposure, porous hydrophobic matter will transfer to the receiving printing plate in all areas, and consequently the transfer is then no longer selective. Analogously if the adhesion is too great, in certain circumstances no transfer of porous hydrophobic matter to the receiving printing plate may be realized after imagewise exposure, and in consequence, as in the first case, no image will be formed thereon. Thus, the adhesion of the porous hydrophobic matter to its support has to be adjusted to the forces of adhesion between porous hydrophobic matter, light-sensitive matter, and the surface of the receiving printing plate, coming into operation in the transfer.

The use of a hydrophilic binder in the light-sensitive matter on the light-sensitive sheet, has inter alia the practical advantage (see below) of facilitating the transfer with water. Hydrophilic binders suitable for compounding the light-sensitive matter are gelatin, gum arabic, proteins, and fish glue, though others may also be used, e.g. agar-agar, dextrin, gum tragacanth, methyl cellulose, and polyvinyl alcohol.

The layer structure of the light-sensitive matter, as illustrated in FIG. 1, in general promotes sharpness of image, light-sensitivity, and transfer on relatively rough, e.g. grained receiving printing plates. The light-sensitive layer may, for example, have a thickness of 2–4 microns. It appears that, on transfer, a tearing takes place in this layer at the border line between transferable and non-transferable image portions. Generally in the process of this invention, and probably due to the use of water to assist the transfer, this does not seem to affect adversely the formation of a sharp image on the receiving printing plate. In the foregoing it has already been pointed out that the porous hydrophobic matter should follow the tearing process.

The sensitizing compound may be distributed homogeneously throughout the layer of hydrophilic binder, or may be located in and on the outer surface only of the layer.

Suitable hydrophilic binders may be divided into two classes, those which do not dissolve in water at room temperature and those which do. The distinction between non-dissolution and dissolution naturally is not sharp. The group of binders first mentioned includes those which, when added to water (at room temperature) will at best swell within a reasonable length of time, but will not distribute homogeneously throughout the water; an example is gelatin. When a representative of the other group is added to water (at room temperature), it will, after some time, be homogeneously mixed with the water; an example is gum arabic.

By using one or the other kind of binders different effects are obtained on transfer with the aid of water at room temperature, each of which has its especial advantages. This may be illustrated as follows:

A transfer process is carried out at room temperature. The light-sensitive substance is of such a nature that on exposure it will decrease the receptivity for water, or solubility in water, of the binder. When working with a light-sensitive layer of a non-dissolving hydrophilic binder, porous hydrophobic matter will be transferred from the less exposed image portions to the receiving printing plate. When working with a light-sensitive layer of hydrophilic binder soluble in water at room temperature, treatment with a small quantity of water will not dissolve the binder in the unexposed portions, but it will cause the binder to become adhesive there and bring about transfer of porous hydrophobic matter. The treatment with water will not be sufficient for achieving this in the exposed portions, in which the solubility of the layer has decreased. Thus in these portions no transfer will take place.

When in the case last described the transfer is carried out with a greater quantity of water, the binder in the less exposed image portions will be removed from the light-sensitive sheet by dissolution. Thus in these image portions there is little or no chance of porous hydrophobic matter being transferred. In the more exposed portions the binder has lost its solubility, but it still has sufficient capacity for absorbing water to develop an adhesive effect with the absorbed water on transfer. In this way porous hydrophobic matter may now be transferred from the exposed image portions to the receiving printing plate. Thus a negative printing plate and a positive remnant image are formed, i.e. one and the same light-sensitive layer may bring about opposite results.

As demonstrated above, the process according to the invention may be carried out with the aid of light-sensitive sheets the light-sensitive matter of which, on exposure, alters its adhesive power in wetted condition.

Since in the process of the invention the transfer is carried out with the aid of water, those light-sensitive sheets are of particular utility in which the light-sensitive matter on exposure (or exposure plus after-treatment), is altered in its water-receptivity.

Light-sensitive sheets of which the light-sensitive matter on exposure (or on exposure plus after-treatment), alters its power to swell with water, also find application in the process of the invention. They are advantageous when transferring on to grained receiving printing plates.

The power of swelling with water naturally implies receptivity for water. On the other hand, water-receptivity is sometimes found in cases in which the swelling power is only slight. In general it is impracticable to discriminate sharply between receptivity for water, adhesive power on wetting, and swelling power.

In the foregoing discussion the difference in behaviour of a light-sensitive layer under different transfer conditions has been described, i.e. the behaviour of a light-sensitive layer with a soluble binder for the cases in which little and much water is used in the transfer. It has also been explained how one and the same light-sensitive layer can produce opposite transfer- and opposite remnant images. In one of the examples which follow a case is described in which, on varying the temperature, the same phenomenon was observed with a layer of light-sensitive matter containing a non-soluble binder (gelatin). Also in this case the nature of transfer and remnant image could be changed from positive to negative or from negative to positive respectively. Whatever the transfer conditions on the first transfer may, however, have been, and consequently of whatever nature a remnant image may be, it may be transferred to a receiving printing plate in a transfer operation differing from the first.

If, for example, the first transfer has been carried out at room temperature, the remnant image obtained may be transferred at a higher temperature. If in the first transfer the separation has been carried out immediately after the pressing-together, in the second transfer the cooperating surfaces may be left in contact with each other for a somewhat longer time after the pressing-together. In the first transfer the receiving surface may likewise have been a surface having little or no adhesive power, and then the second transfer may be carried out on to a receiving printing plate having some adhesive power. Thus for the purposes of the invention, it is not essential that the first transfer be carried out on to a receiving printing plate; it may just as well take place on another receiving support, for example on a suitable sheet of paper. The first transfer may also be replaced by a washing-out step.

The variants of the invention here described can be used to advantage, for example, when it is desired to make a positive printing plate from a negative original. The result, however, will always be that the image portions on the printing plate will carry porous hydrophobic matter from the imagewise exposed light-sensitive sheet.

The light-sensitive matter of the light-sensitive sheets for the process according to the invention, like that which is used in my copending U.S. patent application Serial No. 341,198, is of the kind which, as a result of the photochemical reaction in those image portions which correspond to the light (white) image portions of the original, undergoes an alteration (not occurring or occurring only to a slight extent in the non-exposed or less exposed portions corresponding to the dark portions of the original), which affects the transferability of porous hydrophobic matter from the sheet to the receiving printing plate.

In certain cases said transferability is altered by the light reaction in one sense, in other cases in the other sense. In most of the light-sensitive systems here under consideration, the water-receptivity is reduced by exposure. With other light-sensitive systems, which nevertheless are of the same kind, the contrary is the case.

The light-sensitive material, used in the invention, is essentially of the same kind as that which already finds wide application in various photographic and photomechanical processes. This sort of light-sensitive material, as well as processes which can be carried out with it, are described in the literature in many variants.

For instance, reference is made to J. M. Eder: "Ausführliches Handbuch der Photographie," vol. IV, 2nd part, 1926, wherein on pages 73–77 the so-called pigment paper (carbon tissue) is described, as well as the making of pigment prints (carbon prints) therewith. Sensitized pigment paper (carbon tissue) also finds wide application in the intaglio-printing technique for the making of an image in a metal (mostly copper) surface. See Eder: l.c. 3rd part, 4th edition, page 110. Also known are light-sensitive pigment layers on light-pervious supports, see Eder: l.c. 2nd part, pages 212–215. The light-sensitive material in such sensitized pigment papers (carbon tissues) principally consists of bichromated gelatin.

Further in Eder: l.c. 2nd part, pages 245–279, the gum-bichromate printing process is described. The light-sensitive material of sensitized gum-bichromate printing paper principally consists of gum arabic and bichromate.

Light-sensitive material of the said kind is also used in producing relief printing matrixes. See: Eder, "Rezepte, Tabellen und Arbeitsvorschriften," 16–17 edition, wherein on page 264 a process is described for producing relief printing matrixes in zinc. As light-sensitive material there is mentioned here a protein and bichromate. Furthermore there is described on page 275 a process for producing half-tone matrixes in copper; in which the light-sensitive material is fish-glue, glucose (grape-sugar) and bichromate.

The above-mentioned light-sensitive materials belong to the kind, in which, by photochemical reactions only, or by a photochemical reaction followed by an aftertreatment, an alteration (as compared to the situation before exposure) is effected, which involves a reduction of, for instance, the receptivity for water of the material.

Also suitable for use in the invention is light-sensitive material in which, by the photochemical reaction, a reversed alteration (as compared to the situation before exposure) is being effected. Such light-sensitive material mainly consists of a combination of a ferric-compound, tartaric acid and gum arabic as is used in the so-called pigment-dusting-on process as described in Eder, l.c. 4th part, 3rd edition, pages 27 and 28.

Another example of a light-sensitive material applicable to the invention is used in colour photography, see Eder, l.c. 2nd part, page 377.

In addition to the compositions and compounds already mentioned, other substances have also been suggested for compounding light-sensitive matter of the said kind. As examples there may be mentioned: auramin, erythrosin (tetraiodofluorescein), diazo compounds and azido compounds. For these, reference is made to Eder, l.c. 2nd part, page 39; Netherlands Patents Nos. 35,423 and 59,407; and German Patent No. 858,195.

In the process according to the invention a light-sensitive sheet is preferred which is composed in such a way that in the unexposed condition of the sheet porous hydrophobic matter is transferable, and that the exposure of the light-sensitive matter causes a decrease of transferability of porous hydrophobic matter. Such a light-sensitive sheet yields positive printing plates from positive originals, without a reversal being necessary.

In the process of the invention a sheet of which the light-sensitive matter contains a chromate will render particularly good service. The use of this light-sensitive matter amounts to that of the classical combination of chromate and colloid. Such light-sensitive matter has little stability, but at low temperature it may nevertheless be stored for a reasonable length of time. Chromate-colloid systems of greater stability are known from United States Patent No. 2,526,759.

In an embodiment of the process according to the invention a diazo compound is used to advantage in the light-sensitive matter of the sheet. Most of these compounds have good light-sensitivity, and they bring about a steep gradation desirable in the making of printing plates. Diazo layers are of better stability than chromate layers.

As in the Netherlands Patent No. 25,053, when using diazo compounds, the light reaction may be followed by a chemical after-treatment, upon which the physical alteration causing the difference of transferability of porous hydrophobic matter then manifests itself. An example of this is a diazo-colloid layer, as described in Netherlands Patent No. 25,053, which after exposure undergoes a treatment with chromate. In the process of the invention such an after-treatment may be combined with the transfer operation by dissolving the chemical for the after-treatment in the transfer water.

Similarly an after-treatment may consist of a treatment with a buffered solution of an azo dyestuff coupling component, which will form an azo dyestuff with the diazo compound which has been left in the imagewise-exposed light-sensitive matter. Then the azo dyestuff may, for example, alter the physical properties of the binder in the light-sensitive matter, and thus cause a difference of transferability, as required for the process according to the invention.

Instead of carrying out said after-treatment, the light-sensitive matter may be composed of a diazo compound and an auxiliary chemical, which may assist in causing a difference of transferability, as required for the process according to the invention. Auxiliary chemicals may, for example, be a chomate or an azo dyestuff coupling component. When the latter is applied, imagewise exposure may be succeeded by a treatment with ammonia fumes to induce coupling.

Because of its cleanliness and simplicity, however, a process is preferred in which there is used a light-sensitive sheet of which the light-sensitive matter alters through mere exposure (without interaction with another chemical or a chemical aftertreatment) in such a way that it can cause a difference of transferability with water of porous hydrophobic matter as compared with that transferability in the condition before exposure.

Good and reliable results are obtained when in the process according to the invention a light-sensitive sheet is used of which the light-sensitive matter contains a diazo compound the light decomposition product of which has the property of precipitating proteins (compare Netherlands Patent No. 35,423). Most of the examples will be based on the application of such a diazo compound, which may be used without the aid of any other chemical.

It will be appreciated that the use, in the transfer, of water (to which no chemical activity, or at any rate no pronounced chemical activity can be attributed) is not a chemical after-treatment.

The process according to the invention may also be carried out with a light-sensitive sheet in the light-sensitive matter of which an azido compound (compare, inter alia, Netherlands Patent No. 59,407 and German Patent No. 858,195) is used. For such a sheet, a p,p'-diazido-o-o'-disulphonic acid stilbene (compare Netherlands Patent No. 59,407) is particularly suitable.

Figure 4:
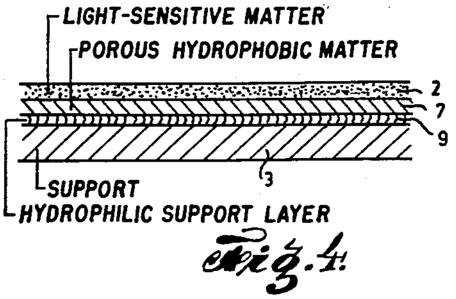
FIG. 4 illustrates another structure of a light-sensitive sheet.

In an embodiment of the process according to the invention at least one surface of the support of the light-sensitive sheet carries a hydrophilic auxiliary layer, and this layer carries porous hydrophobic matter and, superposed thereon, light-sensitive matter. This sheet is illustrated by FIG. 4 and consists of a support 3, auxiliary layer 9, porous hydrophobic matter 7, and light-sensitive matter 2. Because water is used as the transfer auxiliary, the sheet yields an excellent printing plates with particular ease, having the merits already described.

For the said auxiliary layer, soluble substances such as polyvinyl alcohol, gum arabic, agar-agar, methyl cellulose, and many others are suitable. Substances which are insoluble at room temperature may also be used; they should not, however, display too great adhesive power on wetting with the transfer water. Thus, for example, casein is suitable, and so is slightly hardened or tanned gelatin.

An explanation of the utility of porous hydrophobic matter on a hydrophilic surface might perhaps be as follows:

Some light-sensitive compounds, such as certain condensation products of diazo compounds with formaldehyde, are capable of yielding light decomposition products which are probably capable of polymerizing. These light decomposition products in cooperation with the hydrophilic binder may, probably by blocking the pores, affect the transferability of porous hydrophobic mater on (and possibly in) which they have been formed. It may be supposed that the transfer water cannot reach the hydrophilic surface underneath the blocked porous hydrophobic matter; in consequence it will remain dry, and its linkage with the hydrophobic matter relatively strong. On the other hand, non-exposed porous hydrophobic matter will remain unblocked, and through it the transfer water can wet the hydrophilic surface and, because hydrophobic matter will have little adhesion to a wetted hydrophilic surface, will weaken its linkage with the hydrophobic matter. It is then this latter hydrophobic matter, which will have the greater transferability. Obviously a blocking process as assumed above may also be achieved with other light-sensitive systems.

A substance may be added to the porous hydrophobic matter which contrasts visually with the surface of the receiving printing plate. The porous hydrophobic matter may also per se contrast visually with that surface.

In a particular embodiment of the process according to the invention at least one hydrophilic surface of the support of the light-sensitive sheet has an intaglio relief, and this surface carries porous hydrophobic matter in its relief, and, superimposed thereon, light-sensitive matter. This intaglio relief in the sheet makes the transfer with water more selective, and the printing plates obtained yield stronger and sharper prints. This may perhaps be due to the intaglio relief which has been formed in the upper surface of the transferred hydrophobic matter on the printing plate and which, even more than the hydrophobic matter proper, determines the greasy printing ink-receptivity. Said hydrophilic surface may be the surface of the support proper or that of the auxiliary layer referred to above. A suitable intaglio relief of the hydrophilic surface may, for example, be formed by pressing against a grained surface, with the latter being used as a matrix. It may have other forms, such as the relief used in rotogravure.

Figure 5:
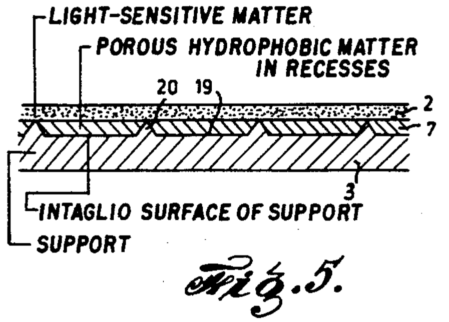
FIG. 5 illustrates a special structure of a light-sensitive sheet for use in the invention.
Figure 6:
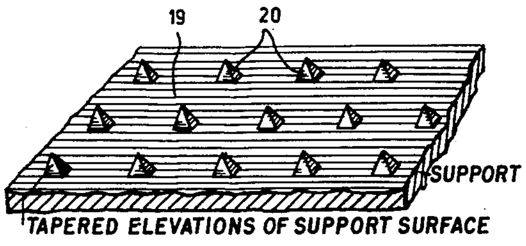
FIG. 6 is a perspective view of a particular intaglio surface.

In this respect particularly good results are obtained when the intaglio relief in the sheet has the form of a smooth surface with elevations which have a pyramidal or conical form. This is illustrated by FIGS. 5 and 6. The support is indicated by 3, its smooth surface by 19, and the pyramids thereon by 20. The relief is filled with porous hydrophobic matter 7, and superimposed thereon is the layer of light-sensitive matter 2. The tops of the pyramids or cones may naturally be slightly rounded.

This structure combines relatively good resistance to damage on manipulation with relatively easy transfer. This may probably be accounted for by the lateral pressure which during the transfer operation is exerted on the porous hydrophobic matter, which lateral pressure cannot laterally shift the porous hydrophobic matter located between the elevations, and for that very reason conduces to loosening this matter from the support.

It has been found that in such a sheet the distance between the tops of said elevations preferably averages 20–80 microns and their height 5–15 microns.

A light-sensitive sheet of special interest in the process according to the invention has a support which is dimensionally stable against wetting. This means that the body of the support of the sheet is dimensionally stable against wetting in the transfer. One or both surfaces of the support nevertheless are hydrophilic. The receiving printing plate (which later will become the printing plate) will practically always be dimensionally stable against wetting; this is normally an essential requirement for such a printing plate. When the light-sensitive sheet is dimensionally stable, the full advantage of true-to-scale printing is obtained. Supports dimensionally stable against wetting are, for example, a metal plate, a glass plate, or a sheet of artificial resin or of ebonite.

In another embodiment of a light-sensitive sheet for use in the process according to the invention the light-sensitive matter contains a thermosetting resin. When, as will be described later, the printing plate is heated after transfer, the resin will set and enhance the resistance of the printing plate. Examples of suitable thermosetting resins are the lower polymers of urea-formaldehyde resin, of phenol-formaldehyde resin, of melamine-formaldehyde resin, and the like.

The manufacture of light-senisitive sheets as described above is illustrated in the examples, which follow.

To obtain a large number of copies, i.e. for a "long-run" plate, it is necessary to subject the printing plate, in the finishing operation, to a treatment improving the resistance of the transferred matter to the planographic printing operations. This, in practice, requires that the linkage between transferred porous hydrophobic matter and printing plate should be made stronger than the linkage existing after the mere transfer operation (the previously described ease of retouch was due to the relative weakness thereof), i.e. strong enough to resist the repeated damping and taking up and delivering of printing ink in the planographic printing process. The resistance may thus be improved, for example, by subjecting the printing plate to high pressure. The resistance may, however, also be enhanced by covering the transferred matter with substances resistant to water.

In an embodiment directed to the making of long run planographic printing plates, the printing plate is heated, in order to improve said resistance (compare the enhancement of the resistance of a printing plate by heating, as described in the British Patent No. 678,599). By the heating operation, the greasy printing ink-receptivity of the transferred image portions may at the same time be improved.

In another embodiment, likewise directed to the making of long run planographic printing plates, the matter transferred to the surface of the printing plate contains a tannable substance, and in order to improve said resistance said substance is tanned. In the case of gelatin, for example, a treatment with formaldehyde, alum, chrom alum, and other known tanning agents is appropriate.

In yet another embodiment, also directed to the making of such long run planographic printing plates, the matter transferred to the surface of the printing plate contains a diazo compound capable of forming hydrophobic azo dyestuffs, and in order to improve said resistance a hydrophobic azo dyestuff is formed from that diazo compound by treatment with a buffered solution of an azo dyestuff coupling component.

In the production of such long run planographic printing plates it is also possible to provide that the matter transferred to the surface of the printing plate contains a diazo compound and an azo dyestuff coupling component, which on being coupled with one another will form a hydrophobic azo dyestuff in order to improve said resistance, the printing plate is then subjected to a treatment with ammonia fumes.

According to a further embodiment directed to the making of such long run planographic printing plates, the matter transferred to the surface of the printing plate contains light-sensitive matter, the water-receptivity of which decreases on exposure to light, and in order to improve said resistance the printing plate is exposed. In most cases in which unexposed light-sensitive matter is transferred together with the porous hydrophobic matter, such unexposed light-sensitive matter will automatically fulfil the above-mentioned requirements. When the receiving printing plate is pervious to light, the exposure may be carried out from the rear.

Although not essential in the making of planographic printing plates, it is advisable in the process according to the invention that the matter used in the transfer be made to contrast visually with the surface of the receiving printing plate. This is conducive to the checking and retouching of the printing plate after the transfer operation, preferably before the finishing. In many instances this will be a matter of the choice of the colour of the transferred matter on the one hand and that of the surface of the receiving printing plate on the other hand. In general the receiving printing plate will have a light colour, and then the matter transferred should be dark. Thus the porous hydrophobic matter may be dark by nature or deliberately pigmented. Also, however, the light-sensitive matter may be pigmented, and in that case the pigment used must not form a serious obstruction in the exposure. The pigment may also be formed after the transfer operation. When, for example, the matter transferred contains a diazo compound, an azo dyestuff may be formed therein.

The imagewise exposure of the light-sensitive sheet may be effected optically. In many cases, however, a contact-copying method will be preferred. In contact-copying the light-sensitive sheet is exposed in the manner of FIG. 1. When the sheet is sufficiently transparent for that purpose, screen reflectography with a separate screen (compare French Patent No. 762,542) may also be employed.

Figure 7:
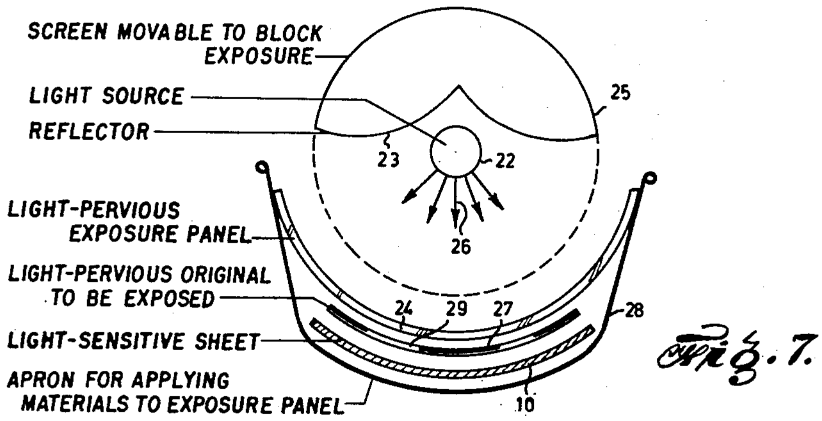
FIG. 7 illustrates the imagewise exposure.

FIG. 7 is a diagrammatic cross-section of a copying apparatus, in which 22 is a high-pressure mercury vapour lamp having, for example, a length of 42 cm. and a power of 700 watts, 23 an aluminium reflector, and 24 a segment of a glass cylinder with an outside diameter of 19 cm. By means of shade 25, rotatable about its axis through the path indicated by a dotted line, the surface to be exposed can be shaded from the light beams 26.

In order to achieve the required contact between light-sensitive sheet and tracing, the light-sensitive sheet 10 to be exposed, together with the tracing 29, with image portions 27, is pressed by means of the blanket 28 against the outside of the glass cylinder, and with opened shade 25 is irradiated from lamp 22 through cylinder 24. The apparatus may likewise be used for the finishing by exposure of flexible printing plates as described above.

Preferably, according to the invention, the original from which the printing plate is to be made should not contain areas of continuous tones.

The pressing-together necessary for transfer will preferably be carried out in such a way that the two cooperating sheets (exposed sheet and receiving printing plate) are laid on each other with liquid in between, and then pressed together by means of at least one pressing roller. In this manner the occurrence of air bubbles and similar difficulties, which may occur in other compressing methods, is avoided.

Figure 8:
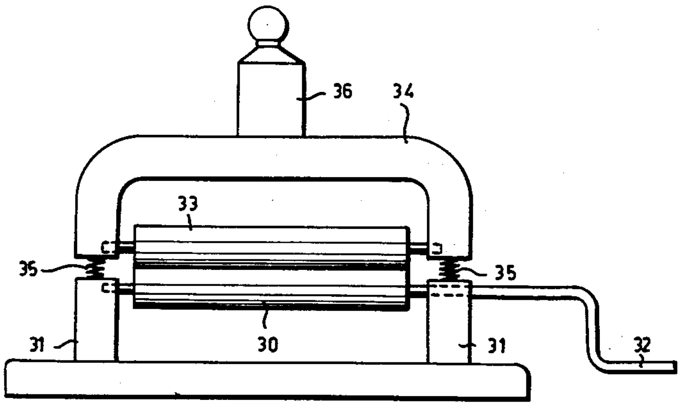
FIG. 8 illustrates an apparatus for pressing together the imagewise exposed sheet and receiving printing plate in the transfer operation.

FIG. 8 diagrammatically represents a simple apparatus suitable for such pressing-together of an exposed sheet and a receiving printing plate. Rubber roller 30 is mounted in the bearings 31 on the base, and is driven by means of crank 32. The rubber roller 33 is mounted on both sides in frame 34, which is supported on its sides (not shown). The springs 35 neutralize the weight of roller 33 and frame 34. On top of frame 34 a weight 36 is placed, which weight will determine the pressure of roller 33 on roller 30. The rubber rollers have, for example, a length of 280 millimetres, a diameter of 40 millimetres, and a hardness of 75 Shore.

Although in general the transfer is carried out at room temperature, in certain cases application of heat in the transfer may be useful. Preferably this heat will be applied to the rollers by means of which the transfer surfaces are pressed together. In certain circumstances this yields better transfer, and it has, at the same time, the advantage that part of the transfer water is eliminated by evaporation.

Figure 9:
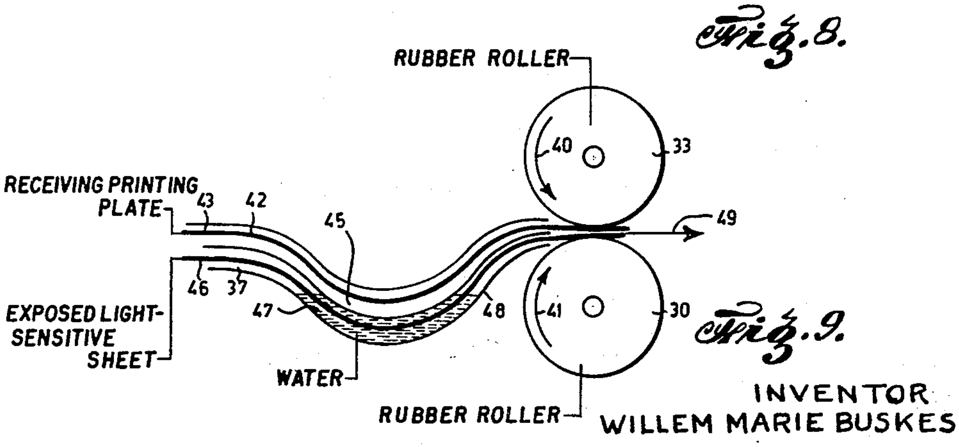
FIG. 9 illustrates a transfer apparatus for combined wetting and pressing-together.

FIG. 9 is a diagrammatic cross-section of a transfer apparatus for the combined wetting and pressing-together previously described. Two pressing rollers are indicated by 30 and 33; they rotate according to arrows 40 and 41. The pressing rollers 30 and 33 have, for example, a diameter of 40 mm., a length of 280 mm., and a hardness of 75 Shore. They exert a pressure on each other which can be adjusted to the requirements of a given transfer operation carried out with a given exposed sheet and receiving printing plate. Exposed sheet 46 is inserted via slot 37 and is conveyed through the liquid 47, which is contained in trough 48, to reach the pressing zone between rollers 30 and 33. Its imagewise exposed surface is turned upward. Measured along the travelling path of the sheet, the distance between the place where it is immersed and the pressing zone is 10 cm. The receiving printing plate 43 is inserted into the apparatus via slot 42 with its receiving surface downward, and is conveyed through slot 45, not filled with liquid. The two sheets meet in the pressing zone, are joined there, leave the apparatus in the direction of arrow 49, and may be separated by hand.

When in a given case it is desirable to wet the receiving surface instead of the exposed sheet, the situation remains as indicated in FIG. 9, with the difference, however, that now 46 denotes the receiving printing plate, receiving surface turned up, and 43 the exposed sheet, exposed side down.

Also slot 45 may be filled with liquid (the same as that in trough 48 or a different one), so that both sheets are wetted.

The separation of the exposed sheet from the printing plate may as a rule be carried out shortly after they have been pressed together.

As already stated, most of the examples are based on the use of one and the same diazo compound. This is the condensation product of p-diazo-diphenylamine and formaldehyde, prepared according to Example I of the Netherlands Patent No. 35,480. In the examples this diazo compound, for the sake of brevity, will each time be referred to as "diazo aldehyde." The examples serve to illustrate the various embodiments of the invention, and owing to the use each time of the same diazo compound, the respective results of the examples become comparable with each other. Apart from this, other compositions of the light-sensitive matter are used in some examples.

Likewise for the sake of brevity, the terms "cellulose acetate sheet" and "gelatin" are used without any further indication. By "cellulose acetate" sheet is to be understood a sheet having an acetyl content corresponding to about 50% by weight of combined acetic acid (the same consideration applies to a cellulose acetate layer); if not otherwise indicated, the sheet will have a weight of 80 g. per sq. metre. By "gelatin" without any further indication there is to be understood the Super Photo JO–5 type. This acetate sheet and this gelatin are merely examples of numerous suitable qualities. In the examples only one quality of each is used, in order to make the results more readily comparable with one another.

The same considerations apply to "carbon black" and "asphalt." By way of example, carbon black of the Kosmos–20 type was always used; the asphalt used was always of the Ennjay oxidized asphalt, 285/300 M.P. type. The same consideration applies to the term "transparent paper"; likewise for the reasons mentioned, "transparent paper" No. S–1582 Super Transparent of 90 g. per sq. metre was always used.

Likewise for the sake of brevity and for better comparison, the examples merely refer to "deacylation" of cellulose acetate surfaces without any further indications. This deacylation was carried out as follows.

The cellulose acetate sheet was immersed for 1 sec. and at a temperature of 28° C. in a solution of:

600 cc. ethyl alcohol
50 cc. water
43 g. potassium hydroxide.

The sheet was subsequently dried so as to be dry after exactly 20 seconds; thereupon it was immersed for 1.5 seconds, this time at a temperature of 27° C., in the following liquid:

600 cc. ethyl alcohol
300 cc. water
72 g. potassium hydroxide and it was dried so as to be dry after exactly 10 seconds. It was subsequently washed in running water for 30 seconds, and immediately afterwards immersed for 7.5 seconds at room temperature in a solution of the following composition:

600 cc. ethyl alcohol
3150 cc. water
75 g. oxalic acid.

The sheet was then dried so as to be dry after exactly 12 seconds.

This is one of many suitable methods for deacylation, and in the examples it is referred to as "deacylation."

As already stated, the exposure may be effected in different ways. When not otherwise indicated, the examples are based on contact-copying by light transmission in the apparatus of FIG. 7. A tracing on transparent paper serves as the original. For the purpose of making ordinary planographic prints a non-laterally reversed image is formed on the light-sensitive side of the sheet. For making offset prints, a laterally reversed image is formed thereon.

In many examples the receiving printing plate is referred to as "finely grained aluminium printing plate," for which in those examples an aluminium sheet commercially known as "Rotaprint E–RKL 2 Sorte" was used. It is one of the many suitable planographic metal sheets. In other examples a receiving printing plate made of paper was used, commercially known as "Rotamasta Blue." It is one of the many suitable planographic papers, and in the examples it is referred to as "paper receiving printing plate."

When in the examples a wetting operation, for whatever purpose, is applied, it is, if not otherwise indicated, carried out with water.

In the examples the apparatus of FIG. 8 or that of FIG. 9 is used for the pressing-together. The travelling speed through either of these apparatuses is referred to as "transfer speed" (in metres per minute). The "transfer pressure" is indicated in kg. per lineal cm. of the pressing rollers.

In many examples in intaglio surface in the form of a smooth surface with elevation (compare FIGS. 5 and 6) is used. The average distance between the tops of the elevations is referred to as "top distance," and the average height of the elevations above the average level of the smooth surface as "height."

Where in the examples a light-sensitive sheet according to FIGS. 5 and 6 is referred to, there is meant a light-sensitive sheet of which the support 3, showing the intaglio relief, consists of cellulose acetate. The intaglio relief is obtained by making the surface mouldable, e.g., by heating or wetting with a solvent like acetone. Thereupon the intaglio relief of FIGS. 5 and 6 is embossed. In most cases the intaglio relief surface is deacylated. The intaglio relief is coated with the mixture for forming porous hydrophobic matter, and after drying is covered with light-sensitive matter. In some cases a support having a cellulose acetate layer is used.

When in the examples offset prints are made, wherever not otherwise indicated, this is done by means of the "Rotaprint RKL Office Offset printer," equipped with automatic damping installation. The finished printing plate is mounted in this offset machine, the image side of the plate is washed with a wet sponge, damped and inked a few times, and then prints are made.

The printing ink used in the examples is always "Rotaprint printing ink, Black, RF991 type."

It is obvious that the use of one single type of the materials and the application each time of one single method in the examples is not to be understood as a limitation on the scope of the invention in any respect whatsoever.

*Example I*

Support: transparent paper. The layer of porous hydrophobic matter is formed by sparingly coating with the following mixture:

120 g. carbon black
15 g. cellulose acetate butyrate of the AB/500/1 type (this is one of the many suitable binders for the hydrophobic matter, and it is referred to in the following examples as "cellulose acetate butyrate")
1000 cc. ethyl acetate and drying. The light-sensitive layer is formed by casting the following solution:

80 g. gelatin
20 g. diazo aldehyde and
20 g. magnesium sulphate in
1000 cc. water and drying. The layer weighs approximately 3 g./sq. metre. It is water-receptive, swellable with water, and becomes adhesive on wetting with water. Exposure: 15 sec. Receiving printing plate: finely grained aluminium printing plate. Transfer operation: the imagewise exposed sheet is immersed in water for a few seconds and subsequently pressed together with the receiving printing plate. Transfer speed: 3 m. Transfer pressure: 2 kg. Separation: shortly after pressing-together. The planographic printing plate formed is positive. If necessary, it is retouched. Finishing: the printing plate is kept at 150° C. for 1.5 min. and cooled; the image side of the printing plate is treated for 0.5 min. with the following solution:

150 g. gum arabic
900 cc. water
27 cc. phosphoric acid (s.g. 1.3)
0.5 g. carbolic acid.

In the following examples this solution will be referred to as "fixing solution." After drying, positive offset prints are obtained with the finished printing plate. Instead of on a surface of transparent paper, the layer of porous hydrophobic matter with the light sensitive layer on it might also have been formed on the surface of another support, e.g. on cellulose hydrate, supercalendered paper, tubsized well calendered paper, art paper, smooth parchment paper, and even on a freshly exolated aluminium plate. The porous hydrophobic matter would also have displayed towards the hydrophilic surfaces of these supports an adhesion reasonably well adjusted to the requirements of the process of the invention.

*Example II*

Support: cellulose acetate sheet of 25 g./sq. metre, pasted under pressure against a sheet of white paper. The cellulose acetate surface is deacylated. The layer of porous hydrophobic matter is formed on the deacylated surface by coating with the following mixture:

200 g. carbon black
40 g. asphalt
1000 cc. xylene and drying. The light-sensitive layer is formed by casting:

30 g. of a not completely saponified polyvinyl-acetate, Elvanol type (grade 20–105; 43–50% hydrolysed)
25 g. diazo aldehyde in
50 cc. water and
50 cc. ethyl alcohol and drying. The layer weights approximately 3 g./sq. metre. It is water-receptive and becomes adhesive on wetting with water. Exposure: 20 sec. Receiving printing plate: paper receiving printing plate. Transfer operation: the imagewise exposed sheet is immersed for 15 sec. and subsequently pressed together with the receiving printing plate. Transfer speed: 1.5 m. Transfer pressure: 2.5 kg. Separation: shortly after pressing-together. The planographic printing plate formed is positive. If necessary, it is retouched. Finishing: the printing plate is kept at 135° C. for 10 min., cooled, treated with fixing solution for 1 min., and dried.

With the finished printing plate, positive offset prints are obtained.

*Example III*

Support: superficially deacylated cellulose acetate sheet. The layer of porous hydrophobic matter is formed by coating with the following mixture:

200 g. Lithol Echtscharlach R.N. Pulver
200 cc. of a 10% by weight solution of cellulose acetate butyrate in ethyl acetate
1000 cc. ethyl acetate and drying. The light-sensitive layer is formed by casting:

80 g. gelatin
20 g. diazo aldehyde
20 g. magnesium sulphate in
1000 cc. water and drying. The layer weights approximately 3.2 g./sq. metre. It is water-receptive, swellable with water, and becomes adhesive on wetting with water. Exposure: 30 sec. Receiving printing plate: finely grained aluminum printing plate. Transfer operation: in the apparatus of FIG. 9; both troughs filled with water. Transfer speed: 1.5 m. Transfer pressure: 2.75 kg. Separation: shortly after pressing-together. The planographic printing plate formed is a red positive. If necessary it is retouched. Finishing: the printing plate is exposed for 60 sec., treated with fixing solution for 1 min., and dried.

With the finished printing plate, positive offset prints are obtained.

*Example IV*

Support: cellulose acetate sheet. The sheet is superficially wetted with acetone, and pressed against the coarsely grained surface of a zinc plate. After removal of the zinc plate, the sheet shows an intaglio relief, consisting of elevations and recesses. The relief surface is deacylated. The layer of porous hydrophobic matter is formed on the relief surface by coating with the following mixture:

120 g. carbon black
15 g. cellulose acetate butyrate
1000 cc. ethyl acetate and drying. The light-sensitive layer is formed by casting either:

100 g. gelatin
20 g. ammonium bichromate in
1000 cc. water or:

100 g. gelatin
15 g. sodium chromate in
1000 cc. water and drying. In both cases the layer weighs approximately 4 g./sq. metre. In both cases it is water-receptive, swellable with water, and becomes adhesive on wetting with water. Exposure: first layer 20 sec.; second layer 30 sec. Receiving printing plate: finely grained aluminium printing plate. Transfer operation: in the apparatus of FIG. 9; the receiving printing plate is wetted. Transfer speed: 1.5 m. Tranfer pressure: 2.2 kg. Separation: shortly after pressing-together. The planographic printing plate formed is positive. If necessary, it is retouched. Finishing: the printing plate is kept at 160° C. for 10 min., cooled, treated with fixing solution for 1 min., and dried.

With the finished printing plate, positive offset prints are obtained.

*Example V*

Light-sensitive sheet according to FIGS. 5 and 6. Top distance: 60 microns. Height: 10 microns. The relief surface was deacylated. Composition of the mixture for the formation of the porous hydrophobic matter:

120 g. carbon black
15 g. cellulose acetate butyrate
1000 cc. ethyl acetate

The light-sensitive layer was formed by casting:

80 g. gelatin
15 g. sodium salt of 4.4'-diazidostilbene-2.2'-disulphonic acid in
1000 cc. water and drying. The layer weights approximately 2.7 g./sq. metre. It is water-receptive, swellable with water, and becomes adhesive on wetting with water. Exposure: 25 sec. Receiving printing plate: paper receiving printing plate. Transfer operation: in the apparatus of FIG. 9; the imagewise exposed sheet is wetted. Transfer speed: 2 m. Transfer pressure: 2.5 kg. Separation: shortly after pressing-together. The planographic printing plate formed is positive. If necessary, it is retouched. Finishing: the printing plate is kept at 140° C. for 10 min., cooled, treated with fixing solution for 0.5 min., and dried. With the finished printing plate, positive offset prints are obtained.

*Example VI*

Light-sensitive sheet according to FIGS. 5 and 6. Top distance: 60 microns. Height: 10 microns. The relief surface was coated with a solution of gum arabic, which after drying leaves a hydrophilic auxiliary layer of about 1.5 g./sq. metre on the relief. Composition of the mixture for the formation of the porous hydrophobic matter:

100 g. cellulose acetate butyrate in
25 g. ethylene glycol and
1000 cc. ethyl acetate The light-sensitive layer was formed by casting:

80 g. gelatin
20 g. diazo aldehyde
20 g. magnesium sulphate in
1000 cc. water and drying. The layer weighs approximately 2.7 g./sq. metre. It is water-receptive, swellable with water, and becomes adhesive on wetting with water.

The light-sensitive sheet is made dimensionally stable against wetting with water by coating its back surface with the colopymer emulsion of butyl acrylate and vinyl acetate—Acronal 500D—and drying. An adhesive layer is formed.

A vinylite sheet of a thickness of 0.25 mm. is made adhesive in the same way.

Under high pressure at 50° C. the two sheets are pressed together with their adhesive sides turned towards each other and united to one sheet. Exposure: 20 sec. Receiving printing plate: finely grained aluminium printing plate. Transfer operation: the imagewise exposed sheet is immersed for approximately 15 sec. and subsequently pressed together with the receiving printing plate. Transfer speed: 3 m. Transfer pressure: 2 kg. Separation: shortly after pressing-together. The planographic printing plate formed is a faintly visible positive. Finishing: the printing plate is kept at 150° C. for 3 min. and cooled, treated with fixing solution, and dried. With the finished printing plate, positive offset prints are obtained, the dimensions of which differ very little from those of the original.

If a light impervious page of printed matter is taken as the original, the light-sensitive sheet described above is used, but it is not rendered dimensionally stable. Exposure: the light-sensitive sheet is placed with its back on the original; a screen suitable for screen reflectography according to British Patent No. 540,178, with a light transmission of 25% is pressed on the light-sensitive side of the sheet, and exposure is effected through the screen for 4 min. Receiving printing plate: paper receiving printing plate. Transfer operation: in the apparatus according to FIG. 9; the imagewise exposed sheet is wetted. Transfer speed: 2 m. Transfer pressure: 2 kg. Separation: shortly after pressing-together. The planographic printing plate formed is again a faintly visible positive. Finishing: as previously described in this example.

*Example VII*

Light-sensitive sheet according to FIGS. 5 and 6. Top distance: 70 microns. Height: 40 microns. The relief surface was deacylated. Composition of the mixture for the formation of the porous hydrophobic matter:

240 g. fine aluminium powder
10 g. cellulose acetate butyrate
1000 cc. ethyl acetate The light-sensitive layer was formed by casting:

80 g. gelatin
20 g. diazo aldehyde
20 g. magnesium sulphate in
1000 cc. water and drying. The layer weighs approximately 3.2 g./sq.

metre. It is water-receptive, swellable with water, and becomes adhesive on wetting with water. Exposure: 20 sec. Receiving printing plate: finely grained aluminium printing plate. Transfer operation: in the apparatus of FIG. 9; the receiving printing plate is wetted. Transfer speed: 3 m. Transfer pressure: 2 kg. Separation: shortly after pressing-together. The planographic printing plate formed is a faintly visible positive. Finishing: the printing plate is kept at 140° C. for 3 min., cooled, treated with fixing solution for 1 min., and dried. With the finished printing plate, positive offset prints are obtained.

*Example VIII*

Light-sensitive sheet according to FIGS. 5 and 6. Top distance: 70 microns. Height: 10 microns. The relief surface was deacylated. Composition of the mixture for the formation of the porous hydrophobic matter:

200 g. carbon black
40 g. asphalt
1000 cc. xylene

The light-sensitive layer was formed by casting:

80 g. gelatin
20 g. diazo aldehyde
20 g. magnesium sulphate in
1000 cc. water and drying. The layer weighs approximately 3.5 g./sq. metre. It is water-receptive, swellable with water, and becomes adhesive on wetting with water. Exposure: 20 sec. Receiving printing plate: finely grained aluminium or zinc printing plate, at choice. Transfer operation: in the apparatus of FIG. 9; the imagewise exposed sheet is wetted. Transfer speed: 2 m. Transfer pressure: 2.5 kg. Separation: shortly after pressing-together. The planographic printing plate formed is positive. If necessary, it is retouched. Finishing: the printing plate is immersed for 30 sec. in:

100 g. alum in
1000 cc. water rinsed, dried, treated with fixing solution, and dried again.

Alternative finishing method: the printing plate is immersed for 30 sec. in:

25 g. sodium carbonate
15 g. pyrogallol in
1000 cc. water rinsed, dried, treated with fixing solution, and dried again.

Further alternative finishing method: the printing plate is exposed for 20 min. to concentrated formalin vapour, then treated with fixing solution, and dried. With the finished printing plate, positive offset prints are obtained.

A planographic printing plate may be reversed in the following manner: the printing plate is evenly coated with a solution of:

100 g. asphalt in
1000 cc. xylene and dried. With a sponge and water of 35° C., the asphalt layer and transferred matter are removed from the transferred image portions. The other portions remain covered with asphalt. The plate is treated with fixing solution and dried. With the finished printing plate negative offset prints are obtained. If the transfer operation had been carried out at 40° C. at a transfer speed of 2.5 m. and a transfer pressure of 1 kg., a reversed printing plate and reversed offset prints would likewise have been obtained.

A reversed printing plate and reversed offset prints are likewise obtained by transferring the remnant image left on the original light-sensitive sheet, after the transfer operation first described in this example, to a paper receiving printing plate. Transfer operation: after wetting with water of 50° C., the sheet carrying the remnant image is pressed against the receiving printing plate. Printing plate and sheet are kept in contact with each other for some time and then separated. The printing plate formed is negative. Finishing: the printing plate is kept at 150° C. for 3 min., cooled, treated with fixing solution, and dried. With the finished printing plate, negative offset prints are obtained.

By all these processing methods positive offset prints may be obtained from a negative original.

The transfer operation first described in this example may also be carried out on an aluminium or zinc printing plate with a smooth surface. Finishing: the printing plate is heated at 125° C. for about half an hour; after cooling, its image side is exposed to a fine sandblasting treatment (the transfer image remains intact; the uncovered portions of the metal surface are finely grained), rinsed and inked. With the finished printing plate, positive offset prints are obtained.

When the light-sensitive sheet is exposed under a tracing, so as to form a non-laterally reversed image in the sensitive matter 2 (FIGS. 1 and 5), and as receiving printing plate a lithographic stone is used, against which, after wetting, the imagewise exposed sheet is pressed by means of a rubber roller, a positive transfer (laterally reversed) image is obtained on the lithographic stone after the separation. For finishing, the stone is kept at 150° C. for 5 min., is cooled, treated with fixing solution, and dried. After the stone has been wetted and inked, ordinary planographic prints are obtained from it.

*Example IX*

Light-sensitive sheet according to FIGS. 5 and 6. Top distance: 70 microns. Height: 10 microns. The relief surface was deacylated. Composition of the mixture for the formation of the porous hydrophobic matter:

1 part by volume of "dag" colloidal graphite in naphtha, product 450
1 part by volume of ethyl acetate The light-sensitive layer was formed by casting:

80 g. gelatin
20 g. diazo aldehyde
20 g. magnesium sulphate in
1000 cc. water and drying. The layer weighs approximately 3.5 g./sq. metre. It is water-receptive, swellable with water, and becomes adhesive on wetting with water. Exposure: 20 sec. Receiving printing plate: paper receiving printing plate. Transfer operation: in the apparatus of FIG. 9; the imagewise exposed sheet is wetted. Transfer speed: 2.5 m. Transfer pressure: 2.7 kg. Separation: shortly after pressing-together. The planographic printing plate formed is positive. If necessary, it is retouched. Finishing: the printing plate is kept at 135° C. for 5 min., cooled, treated with fixing solution, and dried. Positive offset prints are obtained with the finished printing plate.

If in the manufacture of the light-sensitive sheet:

400 g. iron oxide English red
32 g. asphalt
400 cc. of a solution of 3% by weight of cellulose acetate butyrate in ethyl acetate
48 cc. propylene glycol
1000 cc. xylene is used as the mixture for the formation of the porous hydrophobic matter, a positive printing plate is likewise obtained. However, an exposure of 30 sec. is effected, and in the finishing operation the printing plate is kept at 140° C. for 5 min. and, after cooling, is wetted, inked, treated with fixing solution, and dried. With the finished printing plate, positive offset prints are obtained.

*Example X*

Light-sensitive sheet according to FIGS. 5 and 6.

Top distance: 100 microns. Height: 12 microns. The relief surface was deacylated. Composition of the mixture for the formation of the porous hydrophobic matter:

200 g. carbon black
40 g. asphalt
1000 cc. xylene

The light-sensitive layer was formed by casting either:

100 g. blood albumen in
1000 cc. water or a slightly ammoniacal solution of:

100 g. casein in
1000 cc. water drying, and superficially sensitizing with the following solution:

30 g. diazo aldehyde in
300 cc. water and
700 cc. methyl alcohol and drying again. In all cases the layer weighs approximately 2.7 g./sq. metre. In all cases it is water-receptive, swellable with water, and becomes adhesive on wetting with water. Exposure: 30 sec. Receiving printing plate: paper receiving printing plate. Transfer operation: in the apparatus of FIG. 9; the receiving printing plate is wetted. Transfer speed: 3 m. Transfer pressure: 2 kg. Separation: shortly after pressing-together. The planographic printing plate formed is positive. If necessary it is retouched. Finishing: the printing plate is kept at 140° C. for 3 min., cooled and treated with fixing solution for 1 min., and dried. With the finished printing plate, positive offset prints are obtained.

*Example XI*

Light-sensitive sheet according to FIGS. 5 and 6. Top distance: 80 microns. Height: 8 microns. The relief surface was deacylated. Composition of the mixture for the formation of the porous hydrophobic matter:

120 g. carbon black
15 g. cellulose acetate butyrate
1000 cc. ethyl acetate

The light-sensitive layer was formed by casting:

80 g. gelatin
15 g. p.N-ethyl-N-beta-diethylaminoethylaminobenzene diazonium chloride zinc chloride double salt in
1000 cc. water and drying. The layer weighs approximately 3.5 g./sq. metre. It is water-receptive, swellable with water, and becomes adhesive on wetting with water. Exposure: 35 sec. Receiving printing plate: finely grained aluminium printing plate. Transfer operation: in the apparatus of FIG. 9; the receiving printing plate is wetted. Transfer speed: 3 m. Transfer pressure: 1 kg. Separation: shortly after pressing-together. The planographic printing plate formed is positive. If necessary, it is retouched. Finishing: the printing plate is kept at 150° C. for 5 min., cooled, treated with fixing solution for 0.5 min., and dried. With the finished printing plate, positive offset prints are obtained.

Similar results are obtained if, instead of 15 g. of the above-mentioned diazo compound, 18 g. p.ethyl amino benzene diazonium chloride zinc chloride double salt, or 20 g. p.N.ethyl-N-beta-hydroxy ethyl amino benzene diazonium chloride zinc chloride double salt are used in the sensitizing mixture.

*Example XII*

Support: cellulose acetate sheet of 25 g./sq. metre, pasted under pressure against a sheet of white paper. The cellulose acetate surface is deacylated. The layer of porous hydrophobic matter is formed on the deacylated surface by coating with the following mixture:

120 g. calcium stearate
15 g. gelatin
2 g. Heliogene blue
1000 cc. water and drying. The light-sensitive layer is formed by casting:

80 g. gelatin
20 g. diazo aldehyde
20 g. magnesium sulphate in
1000 cc. water and drying. The layer weighs approximately 3 g./sq. metre. It is water-receptive, swellable with water, and becomes adhesive on wetting with water. Exposure: 20 sec. Receiving printing plate: paper receiving printing plate. Transfer operation: in the apparatus of FIG. 9; the imagewise exposed sheet is wetted. Transfer speed: 1 m. Transfer pressure: 1.5 kg. Separation: a few seconds after pressing-together. The planographic printing plate formed is a blue positive. If necessary, it is retouched. Finishing: the printing plate is exposed for 30 sec., treated with fixing solution, and dried. With the finished printing plate, positive offset prints are obtained.

*Example XIII*

Light-sensitive sheet according to FIGS. 5 and 6. Top distance: 100 microns. Height: 12 microns. The relief surface was deacylated. Composition of the mixture for the formation of the porous hydrophobic matter:

200 g. carbon black
40 g. asphalt
1000 cc. xylene

The light-sensitive layer was formed by casting:

600 cc. Le Page fish glue
16 g. diazo aldehyde in
1000 cc. water and drying. The layer weighs approximately 4 g./sq. metre. It is water-receptive and soluble in water at room temperature. Exposure: 30 sec. Receiving printing plate: paper receiving printing plate. Transfer operation: the imagewise exposed sheet is immersed for 20–30 sec. and subsequently pressed together with the receiving printing plate. Transfer speed: 2.5 m. Transfer pressure: 1 kg. Separation: shortly after pressing together. The planographic printing plate formed is negative. If necessary, it is retouched. Finishing: the printing plate is kept at 150° C. for 3 min., cooled, rinsed, inked, treated with fixing solution for 1 min., and dried. With the finished printing plate, negative offset prints are obtained.

If in the transfer operation the immersion is short and the quantity of water applied is small, or if a mixture of water and alcohol is applied, a positive printing plate is obtained.

*Example XIV*

Light-sensitive sheet according to FIGS. 5 and 6. Top distance: 40 microns. Height: 10 microns. The relief surface was deacylated. Composition of the mixture for the formation of the porous hydrophobic matter:

200 g. carbon black
40 g. asphalt
1000 cc. xylene

The light-sensitive layer was formed by casting:

80 g. gelatin
5 g. oxalic acid
15 g. diazo aldehyde
5 g. 2-3-dihydroxy naphthalene
15 g. p.benzoylamino-2.5-diethoxy-benzene diazonium chloride zinc chloride double salt
1000 cc. water and drying. The layer weighs approximately 3 g./sq.

metre. It is water-receptive, swellable with water, and becomes adhesive on wetting with water. Exposure: 30 sec. Receiving printing plate: paper receiving printing plate. Transfer operation: in the apparatus of FIG. 9; the receiving printing plate is wetted. Transfer speed: 3 m. Transfer pressure: 1 kg. Separation: shortly after pressing-together. The planographic printing plate formed is positive. If necessary, it is retouched. Finishing: the printing plate is exposed to concentrated ammonia vapour for 3 min.; in the transfer image a hydrophobic azo dyestuff is formed; the printing plate is treated with fixing solution and dried. With the finished printing plate, positive offset prints are obtained.

*Example XV*

Support: cellulose acetate sheet of 25 g./sq. metre, pasted under pressure against an aluminium sheet. The cellulose acetate surface is deacylated. The layer of porous hydrophobic matter is formed on the deacylated surface by sparingly coating with the following mixture:

200 g. carbon black
40 g. asphalt
1000 cc. xylene and drying. The light-sensitive layer is formed by casting:

80 g. gelatin
50 g. p-benzoylamido-2.5-diethoxy benzene diazonium chloride zinc chloride double salt in
1000 cc. water and drying. The layer weighs approximately 3.5 g./sq. metre. It is water-receptive, swellable with water, and becomes adhesive on wetting with water. Exposure: 30 sec. Receiving printing plate: paper receiving printing plate. Transfer operation: the imagewise exposed sheet is immersed in the following solution:

15 g. 2.3-dihydroxy naphthalene
25 g. sodium carbonate in
1000 cc. water for a few seconds, and subsequently pressed together with the receiving printing plate. Transfer speed: 3.5 m. Transfer pressure: 1 kg. Separation: shortly after pressing-together. The planographic printing plate formed is negative. If necessary, it is retouched. Finishing: the printing plate is treated with fixing solution for 30 sec. and dried. With the finished printing plate, negative offset prints are obtained.

*Example XVI*

Light-sensitive sheet according to FIGS. 5 and 6. Top distance: 80 microns. Height: 10 microns. The relief surface was deacylated. Composition of the mixture for the formation of the porous hydrophobic matter:

200 g. carbon black
40 g. asphalt
1000 cc. xylene.

The light-sensitive layer was formed by casting:

80 g. gelatin
50 g. anthraquinone disulphonic acid-2.7 in
1000 cc. water and drying. The layer weighs approximately 3.5 g./sq. metre. It is water-receptive, swellable with water, and becomes adhesive on wetting with water. Exposure: 120 sec. Receiving printing plate: paper receiving printing plate. Transfer operation: the imagewise exposed sheet is immersed in:

20 g. potassium bichromate in
1000 cc. water for 30 sec., rinsed with water, and subsequently pressed together with the receiving printing plate. Transfer speed: 2.5 m. Transfer pressure: 1.25 kg. Separation: shortly after pressing-together. The planographic printing plate formed is negative. If necessary, it is retouched. Finishing: the printing plate is wetted and inked, treated with fixing solution, and dried. With the finished printing plate, negative offset prints are obtained.

*Example XVII*

Light-sensitive sheet according to FIGS. 5 and 6. Top distance: 50 microns. Height: 10 microns. The relief surface was deacylated. Composition of the mixture for the formation of the porous hydrophobic matter:

120 g. carbon black
15 g. cellulose acetate butyrate
1000 cc. ethyl acetate.

A slightly hardened gelatin layer was formed by casting:

80 g. gelatin
1.25 g. diazo aldehyde in
1000 cc. water drying, and exposing. The gelatin layer thus formed was impregnated with:

50 g. p.dimethylamino benzene diazonium chloride zinc chloride double salt in
1000 cc. water and dried. The layer weighs approximately 3 g./sq. metre. Although less so than the light-sensitive gelatin layers of some other examples, it is still water-receptive, swellable with water, and becomes adhesive on wetting with water. Exposure: 40 sec. Receiving printing plate: finely grained aluminium printing plate. Transfer operation: the imagewise exposed sheet is immersed in:

20 g. potassium bichromate in
1000 cc. water for 10 sec., rinsed with water, and subsequently pressed together with the receiving printing plate. Transfer speed: 2 m. Transfer pressure: 1 kg. Separation: shortly after pressing-together. The planographic printing plate formed is positive. If necessary, it is retouched. Finishing: the printing plate is kept at 150° C. for 10 min., cooled, treated with fixing solution for 1.5 min., and dried. With the finished printing plate, positive offset prints are obtained.

*Example XVIII*

Light-sensitive sheet according to FIGS. 5 and 6. Top distance: 80 microns. Height: 10 microns. The relief surface was deacylated. Composition of the mixture for the formation of the porous hydrophobic matter.

120 g. carbon black
15 g. cellulose acetate butyrate
1000 cc. ethyl acetate

The light-sensitive layer was formed by successively casting the following solutions and drying after each casting (*a*) 20 g. gelatin
18 g. carbon black
1000 cc. water
(*b*) 20 g. gelatin
10 g. carbon black
1000 cc. water
(*c*) 20 g. gelatin
2 g. carbon black
1000 cc. water
(*d*) 20 g. gelatin
1000 cc. water and finally sensitizing with:

30 g. diazo aldehyde in
1000 cc. water and drying. The layer weighs approximately 4 g./sq. metre. It is water-receptive, swellable with water, and becomes adhesive on wetting with water. Exposure: 30 sec. Receiving printing plate: finely grained aluminium printing plate. Transfer operation: in the apparatus of FIG. 9; the imagewise exposed sheet is wetted. Transfer speed: 3 m. Transfer pressure: 2 kg. Separation: shortly after pressing-together. The planographic printing plate formed is positive. If necessary, it is retouched. Finishing: the printing plate is kept at 135° C. for 1 min., cooled, treated with fixing solution for 1 min., and dried.

Alternative finishing method: the printing plate is immersed for 30 sec. in—

15 g. 2.3-dihydroxynaphthalene
100 g. sodium carbonate in
1000 cc. water

A hydrophobic azo dyestuff is formed in the transfer image. After drying, the printing plate is treated with fixing solution and dried again. With the finished printing plate, positive offset prints are obtained.

When a superficially deacylated transparent cellulose acetate sheet is used as receiving printing plate, the receiving printing plate is wetted for transfer. For finishing, the cellulose acetate printing plate is exposed for 30 sec. with its image side turned away from the light source, treated with fixing solution, and dried. With the finished printing plate, positive offset prints are obtained.

*Example XIX*

Light-sensitive sheet according to FIGS. 5 and 6. Top distance: 70 microns. Height: 10 microns. The relief surface was deacylated. Composition of the liquid for the formation of the porous hydrophobic matter:

200 g. carbon black
40 g. asphalt
1000 cc. xylene

The light-sensitive layer was formed by casting:

80 g. gelatin
20 g. diazo aldehyde
20 g. magnesium sulphate in
1000 cc. water.

and drying. The layer weighs approximately 3.5 g./sq. metre. It is water-receptive, swellable with water, and becomes adhesive on wetting with water. Exposure: 20 sec. Receiving printing plate: a bi-metal plate (a stainless steel plate having a layer of copper on one of its surfaces). Transfer operation: the imagewise exposed sheet is wetted and pressed against the copper surface of the bi-metal plate. Transfer speed: 2 m. Transfer pressure: 1.5 kg. Separation: shortly after pressing-together. The planographic printing plate formed is positive. If necessary, it is retouched. Finishing: the printing plate is etched with ferric chloride solution of 40° Bé. until the copper layer has disappeared, except under the transferred matter serving as a "resist," and thoroughly washed in running water; the transferred matter is removed until the positive copper image becomes visible on the stainless steel plate, the plate is dried and provided with a thin layer of offset printing ink; the ink is removed from the stainless steel surface by washing with a sponge soaked in:

50 g. copper nitrate
50 cc. hydrochloric acid (s.g. 1.19)
50 cc. nitric acid (s.g. 1.13) in
900 cc. water and the plate is rinsed with water and inked. With the finished printing plate, positive offset prints are obtained.

What I claim is:

1. A planographic printing plate comprising a support formed with a hydrophilic printing surface bearing greasy-ink-receptive printing elements in the pattern of a photographic image of an original to be reproduced, each of said elements corresponding in outline to an element of said image and being a torn-out portion of a layer structure common to said elements and being formed of an underlayer of organic film-forming colloid material adhering to said surface and binding thereto a porous frangible crust of hydrophobic solid matter covering the upper surface only of said underlayer and permeated with liquid-receptive pores, the strength of internal cohesion of said crust being less than the strength of its adherence to said colloid material, said colloid material comprising a water resistant product of an insolubilizing treatment of a mixture of a hydrophilic organic colloidal binder insensitive to light and a compound selected from the group consisting of light sensitive diazo compounds, light sensitive azido compounds and light sensitive chromates and light decomposition products thereof.

2. A planographic printing plate comprising a support formed with a hydrophilic printing surface bearing greasy-ink-receptive printing elements in the pattern of a photographic image of an original to be reproduced, each of said elements corresponding in outline to an element of said image and being a torn-out portion of a layer structure common to said elements and being formed of an underlayer of organic colloid film-forming material adhering to said surface and binding thereto a porous frangible, crust of hydrophobic solid matter covering the upper surface only of said underlayer and permeated with liquid-receptive pores, the strength of internal cohesion of said crust being less than the strength of its adherence to said colloid material, said matter being composed of a mixture of a major proportion of a finely divided hydrophobic pigment and a minor proportion of a hydrophobic binder, said colloid material comprising a water resistant product of an insolubilizing treatment of a mixture of a hydrophilic organic colloidal binder insensitive to light and a compound selected from the group consisting of light sensitive diazo compounds, light sensitive azido compounds and light sensitive chromates and light decomposition products thereof.

3. A printing plate comprising a support formed with a printing surface bearing greasy-ink-receptive printing elements in the pattern of a photographic image of an original to be reproduced, each of said elements corresponding in outline to an element of said image and being a torn-out portion of a layer structure common to said elements and being formed of an underlayer of material selected from the group consisting of hardened and unhardened hydrophilic organic film-forming colloid materials adhering to said surface and binding thereto a liquid-permeable porous frangible crust of hydrophobic solid matter covering the upper surface only of said underlayer, said crust being permeated with liquid-receptive pores and the strength of its internal cohesion being less than the strength of its adherence to said colloid material, the outer side of said porous crust of each of said elements being regularly interrupted by a myriad of minute cavities spaced apart at uniform intervals.

4. A printing plate comprising a support formed with a printing surface bearing greasy-ink-receptive printing elements in the pattern of a photographic image of an original to be reproduced, each of said elements corresponding in outline to an element of said image and being a torn-out portion of a layer structure common to said elements and being formed of an underlayer of material selected from the group consisting of hardened and unhardened hydrophilic organic film-forming colloid materials adhering to said surface and binding thereto a liquid-permeable porous frangible crust of hydrophobic solid matter entirely covering the upper surface only of said underlayer, said crust being permeated with liquid-receptive pores and the strength of its internal cohesion being less than the strength of its adherence to said colloid material, the outer side of said porous crust of each of said elements being regularly interrupted by a myriad of minute cavities which do not extend completely through said crust, said cavities having an average depth of between 5 and 15 microns and being spaced apart at intervals averaging between 20 and 100 microns.

5. A planographic printing plate comprising a support formed with a hydrophilic printing surface bearing greasy-ink-receptive printing elements in the pattern of a photographic image of an original to be reproduced, each of said elements corresponding in outline to an element of said image and being a torn-out portion of a layer structure common to said elements and being formed of an underlayer of organic film-forming colloid material adhering to said surface and binding thereto a porous frangible crust of hydrophobic solid matter entirely covering the upper surface only of said underlayer and permeated with liquid-receptive pores, the strength of internal cohesion of said crust being less than the strength of its adherence to said colloid material, said colloid material comprising a water resistant product of an insolublizing treatment of a mixture of gelatin and a compound selected from the group consisting of light sensitive diazo compounds, light sensitive azido compounds and light sensitive chromates and light decomposition products thereof.

6. A planographic printing plate comprising a support formed with a hydrophilic printing surface bearing greasy-ink-receptive printing elements in the pattern of a photographic image of an original to be reproduced, each of said elements corresponding in outline to an element of said image and being a torn-out portion of a layer structure common to said elements and being formed of an underlayer of organic film-forming colloid material adhering to said surface and binding thereto a porous frangible crust of hydrophobic solid matter entirely covering the upper surface of said underlayer and permeated with liquid-receptive pores, the strength of internal cohesion of said crust being less than the strength of its adherence to said colloid material, said colloid material comprising a water resistant product of the baking of a mixture of gelatin and a compound selected from the group consisting of light sensitive diazo compounds and light sensitive azido compounds and light decomposition products thereof.

7. A planographic printing plate comprising a support formed with a hydrophilic printing surface bearing greasy-ink-receptive printing elements in the pattern of a photographic image of an original to be reproduced, each of said elements corresponding in outline to an element of said image and being a torn-out portion of a layer structure common to said elements and being formed of an underlayer of organic film-forming colloid material adhering to said surface and binding thereto a porous frangible crust of hydrophobic solid matter entirely covering the upper surface only of said underlayer and permeated with liquid-receptive pores, the strength of internal cohesion of said crust being less than the strength of its adherence to said colloid material, said matter being composed of a mixture of a major proportion of a finely divided hydrophobic pigment and a minor proportion of a hydrophobic binder, the outer side of said crust of each of said elements being regularly interrupted by a myriad of minute cavities which do not extend completely through said crust, said cavities having an average depth of between 5 and 15 microns and being spaced apart at intervals averaging between 20 and 100 microns, said colloid material comprising a water resistant product of an insolubilizing treatment of a mixture of gelatin and a light sensitive condensation product of formaldehyde and a para-diazodiphenylamine.

References Cited in the file of this patent

UNITED STATES PATENTS

| | | |
|---|---|---|
| 1,010,141 | Herzka | Nov. 28, 1911 |
| 1,118,479 | Dodge | Nov. 24, 1914 |
| 1,618,505 | Beebe et al. | Feb. 22, 1927 |
| 1,762,033 | Schmidt et al. | June 3, 1930 |
| 2,095,018 | Wilmanns et al. | Oct. 5, 1937 |
| 2,100,063 | Zahn | Nov. 23, 1937 |
| 2,295,632 | Buskes | Sept. 15, 1942 |
| 2,532,390 | Bennett et al. | Dec. 5, 1950 |
| 2,548,565 | Staehle | Apr. 10, 1951 |
| 2,593,912 | Orinik | Apr. 22, 1952 |
| 2,596,756 | Yutzy et al. | May 13, 1952 |
| 2,714,066 | Jewett et al. | July 26, 1955 |
| 2,747,999 | Yutzy et al. | May 29, 1956 |
| 2,754,279 | Hall | July 10, 1956 |
| 2,763,553 | Clark et al. | Sept. 18, 1956 |
| 2,900,255 | Charlton | Aug. 18, 1959 |

UNITED STATES PATENT OFFICE

CERTIFICATION OF CORRECTION

Patent No. 3,010,390 November 28, 1961

Willem Marie Buskes

It is hereby certified that error appears in the above numbered patent requiring correction and that the said Letters Patent should read as corrected below.

Column 7, line 61, for "chomate" read -- chromate --; column 8, line 25, for "plates" read -- plate --; column 13, line 13, for "in", second occurrence, read -- an --; line 14, for "elevation" read -- elevations --; column 14, line 41, for "weights" read -- weighs --; column 16, line 25, for "colopymer" read -- copolymer --; column 25, line 32, after "surface" insert -- only --.

Signed and sealed this 17th day of April 1962.

(SEAL)
Attest:

ESTON G. JOHNSON
Attesting Officer

DAVID L. LADD
Commissioner of Patents